Jan. 8, 1963  G. JABBUSCH  3,072,772
ARRANGEMENT FOR INDUCTIVE SOLDERING OR WELDING
LONGITUDINAL SEAMS ON TUBES
Filed March 11, 1960

INVENTOR.
Georg Jabbusch
BY
Pierce, Scheffler & Parker
Attorneys

United States Patent Office
3,072,772
Patented Jan. 8, 1963

3,072,772
ARRANGEMENT FOR INDUCTIVE SOLDERING OR WELDING LONGITUDINAL SEAMS ON TUBES
Georg Jabbusch, Dortmund-Brunninghausen, Germany, assignor to Brown, Boveri & Cie, Aktiengesellschaft, Mannheim, Germany, a joint stock company
Filed Mar. 11, 1960, Ser. No. 14,269
Claims priority, application Germany Mar. 24, 1959
6 Claims. (Cl. 219—8.5)

This invention relates to the welding or soldering of longitudinally extending pipe seams involving use of inductive heating and more particularly to an improved arrangement for inducing the flow of the electric currents along the edge portions of the longitudinally extending slit which are thereafter to be united to form the seam.

In welding or soldering pipe seams, it is quite common to use some form of electrical heating for bringing the parts to be united up to the proper welding or soldering temperature. This can be effected by passing the current, either alternating or unidirectional, through the work piece in a direct manner by means of contact rollers, or the current can be induced to flow in the work piece by inductive principles.

One known arrangement for forming longitudinally extending pipe seams by inductive welding involves use of a loop-shaped inductor past which is moved a sheet metal strip which has been rolled into pipe form with the exception of a narrow, longitudinally extending slit defined by the edge portions of the strip which have been brought into confronting relation during the rolling. The loop-shaped inductor is aligned with and extends parallel to the slit and heats the edge portions to the proper temperature for welding by inducing the flow of currents therein. In addition, roller means are provided which exert laterally inward pressure upon the pipe walls so as to close the slit at the welding zone.

In the customary arrangement, the heat inductor has the general configuration of a hairpin, usually cooled by water, the two parallel legs of the inductor overlying respectively the two confronting edge portions of the slit so that they induce currents to flow along loop-shaped paths in each portion. One part of each loop-shaped path lies close to the edge but the other part is located somewhat to the rear of the edge. Since only the current flow adjacent the edge is principally effective in preparation of the slit for welding, only that part of the current flow in each loop can be regarded as useful to the welding operation. The heat energy represented by the induced current flow in the other part of each loop can thus be regarded as wasted. A further disadvantage of this known arrangement is that the local voltage in the work piece is greatest on both sides of the slit in the vicinity of the inductor end turned away from the weld zone, and can assume such values that a voltage flash-over often occurs at this point along the usually very narrow slit, which leads to a local scorching of the edges of the material.

The object of the present invention is to provide a more satisfactory and more efficient arrangement for inducing flow of electric currents along the zone to be welded, and this objective is attained by use of a so-called "contact bridge" on the pipe, the bridge serving to connect electrically with each other the edges to be welded or soldered shortly before they enter the welding or soldering zone established by the position of the inductor element so that only one loop-shaped current path is established along and bridges the slit. Thus all of the induced current is concentrated to flow in a useful, i.e. material edge heating, manner.

In the accompanying drawings, FIGS. 1 and 2 are views of the hairpin type inductor and the arrangement of the prior art wherein the inductor element induces two closed paths of current flow along the edge portions which lie at opposite sides of the longitudinally extending slit.

Figure 1:
Figure 2:
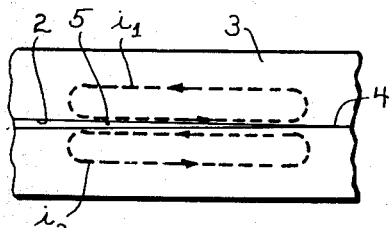

With reference now to FIGS. 1 and 2, and in explanation of the prior art arrangement, the inductor 1, shown in the form of a hairpin, is placed in longitudinal alignment with and bridging the slit 2 of the pipe 3 to be welded into a seam 4. Alternating current flowing through the inductor 1 then establishes two elongated loop-shaped current paths $i_1$ and $i_2$ in the pipe 3, such paths being located on opposite sides respectively of and extending parallel to the edges of slit 2. As previously explained, one side of each of the two loop-shaped current paths runs close to the edge of the slit and is thus useful in heating up the edges to welding temperature. However, the other side of each loop-shaped current path runs at an appreciable distance from the corresponding edge of the slit and is thus of no practical value. Moreover, as previously explained, at a point indicated generally at 5, due to high local voltage conditions, there is much danger of flash-over which leads to local and undesirable scorching of the edges of the pipe.

Figure 3:
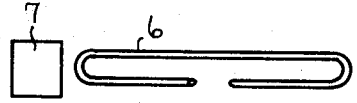
FIGS. 3 and 4 are views corresponding to FIGS. 1 and 2 but showing the improved arrangement according to the invention wherein all of the induced current is concentrated to flow in but a single, loop-shaped path at the weld zone.
Figure 4:
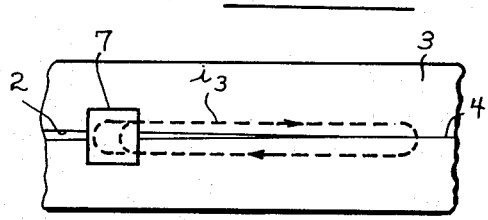

The improved arrangement is illustrated somewhat diagrammatically in FIGS. 3 and 4. Here it will be seen that the inductor 6, in the form of an elongated loop with the terminal ends of the loop located midway along one side of the loop, and through which is passed an alternating current, operates in conjunction with a contact bridge 7 which is located in bridging relation to the opposite edge portions of the slit 2 in advance of the inductor 6 and hence the zone of union so as to establish, by induction, a single elongated loop-shaped current path $i_3$, the sides of which lie on opposite sides respectively of the slit 2 and approximately parallel therewith. Moreover, each side of the current path $i_3$ is located in the immediate vicinity of and equidistant from the edges to be welded so that the heat energy created by the current flow is similarly concentrated. The more efficient use of the induced currents in producing the required heating effect thus makes it possible to operate with a current generator of correspondingly lower output to develop the heat. One end of the current loop $i_3$ is, of course, closed through the contact bridge, and the opposite end is closed by virtue of the fact that the two edges have been brought together to establish the seam 4. The arrangement in accordance with FIGS. 3 and 4 will operate equally as well with an inductor of the hairpin type as shown in FIG. 1. Moreover, since the voltage between opposite points of the slit edges is considerably reduced by the influence of the contact bridge, flash-over between the edges is thus avoided.

Figure 5:
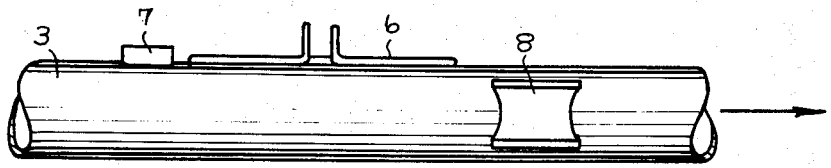
FIG. 5 is a view in side elevation of a portion of the pipe at the welding zone showing the inductor, contact bridge and one of hte lateral pressure rollers.
Figure 6:
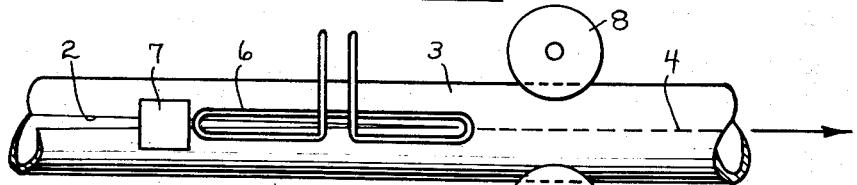
FIG. 6 is a top plan view of the pipe and welding arrangement illustrated in FIG. 5.

FIGS. 5 and 6 of the drawing show an embodiment of the invention based upon the principles illustrated in FIGS. 3 and 4. As in the latter views, the pipe is indicated at 3, the inductor at 6 and the contact bridge at 7. In addition, FIGS. 5 and 6 show the rollers 8, one at each side of the pipe 3 and which exert a laterally inward pressure against the sides of the pipe in order to close the slit 2 into a seam 4 as the welding progresses at the zone of the inductor 6. If necessary, additional means can be provided to cool the various components. Such cooling means are well known and have been omitted. The arrangements for transporting the pipe longitudinally of itself through the welding zone likewise have not been included since these are also well known and would thus complicate the drawings unnecessarily.

As is evident from FIG. 6, the sides of inductor loop 6 are approximately parallel with the edges of slit 2 which gradually narrows at the zone of union and are centered with respect to such edges so that the sides of the induced current loop $i_3$ shown in FIG. 4 will likewise be centered and hence equidistant with respect to the edges of the slit and thus establish a uniform heating effect upon the edge portions.

Figure 7:
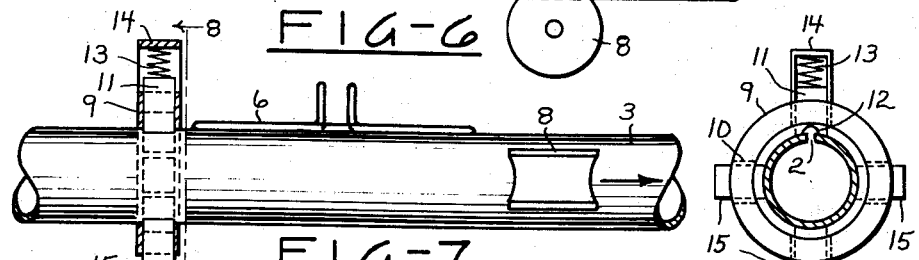
FIG. 7 is a view similar to FIG. 5 but illustrating a modification of the contact bridge structure.
Figure 8:
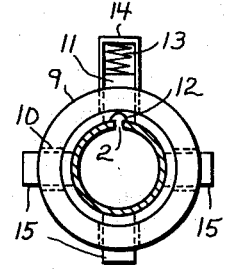
FIG. 8 is a view in vertical transverse section taken on line 8—8 of FIG. 7.
Figure 9:
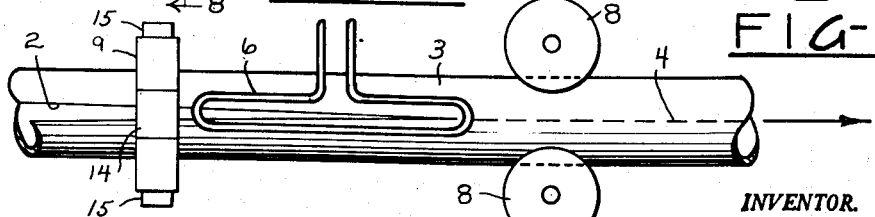
FIG. 9 is a top plan view of the arrangement shown in FIG. 7.

The embodiment of the invention as illustrated in FIGS. 7–9, inclusive, is similar in many respects to the previously described arrangement. Hence, like components such as the inductor 6 and rollers 8 have been assigned the same reference numerals. However, the contact bridge component has a somewhat different construction. In this embodiment, an annular-shaped body 9 surrounds the pipe 3 and includes four radially extending bores 10 spaced 90° apart. Projecting through one of these bores 10 is the contact bridge 11 which at its arcuate lower face engages and therefore electrically bridges the arcuate edge portions of the slit 2 in pipe 3. The lower face of the contact bridge 11 can be provided with a notched portion 12 in the immediate vicinity of the edges of the slit 2 so that any burrs which may have been formed, for example, in the cutting of the sheet metal strip from which the pipe is formed, will not adversely affect the desired contact between the bridge and the face of the pipe at each side of the slit. In order to assure a good contact, the bridge 11 can be urged in the direction of the pipe by means of a helical spring 13 which at its lower end bears against the upper end of the bridge. The upper end of spring 13 bears against the end of a U-shaped bracket 14 which is secured to the annular body member 9.

In addition to the contact bridge 11, three members 15 are arranged respectively in the other three bores 10 of the annular body. These are made adjustable longitudinally of themselves and the inner ends of these members bear against the wall of the pipe at three points spaced 90° apart whereby they guide the pipe and participate in its shaping. The members 15 are preferably made from an insulating material having a high mechanical strength, such as aluminum oxide. In lieu of the slidably adjustable members 15, rollers or balls similarly mounted in the annular body member 9 can be used to guide or shape the pipe.

The contact bridge in accordance with the invention can be of any suitable electrically conductive material. However, it should be resistant to abrasion so as to have a satisfactory useful life. One practical material having these attributes is hard brass. However, other materials may be used depending upon the material from which the pipe is made.

The arrangement according to the invention is particularly well suited for inductive welding or soldering with high frequency currents. However, the invention is not limited to this and the choice of the most expedient frequency will depend in each case upon the type and thickness of the pipe material.

Moreover, the invention is not limited to the specific embodiments which have been described and illustrated. It may be applied to the welding or soldering of longitudinal seams on pipes having a configuration other than circular and it can also be used in arrangements wherein a plurality of seams are welded simultaneously. It can also be adapted to a pipe seaming technique wherein the seam does not extend parallel to the axis of the pipe but rather extends in a helix about the pipe axis. It is also conceivable, without difficulty, to use the invention in conjunction with welding devices with which seams are to be welded inductively on bodies not shaped like pipes. Finally, the device in accordance with the invention, can be used equally well for welding and hard or soft soldering, using fluxes or protective gases in a manner known as such.

I claim:
1. In a device for inductively heating the edge portions of a slit in a body prior to uniting said edge portions such as by welding or soldering to establish a seam, the combination comprising an elongated loop-shaped inductor, the sides of said inductor loop extending approximately parallel with and along opposite edges of said slit and being centered with respect thereto, and a contact bridge located adjacent one end of said inductor loop and electrically interconnecting the edge portions of said slit in advance of said inductor loop and in advance of the zone of union, said inductor loop when energized with alternating current serving to induce a current flow in said edge portions along a single elongated loop-shaped path, one end of said current loop being closed through said contact bridge, the other end of said current loop being closed through the union zone and the sides of said current loop being approximately parallel with the edges of said slit and equidistant therefrom.

2. An inductive heating device as defined in claim 1 wherein the face of said contact bridge which engages the edge portions of said slit is provided with a notched portion in the immediate vicinity of the edges of said slit.

3. An inductive heating device as defined in claim 1 and which further includes spring means urging said contact bridge into engagement with the edge portions of said slit.

4. An inductive heating device as defined in claim 1 wherein the body having the slit to be seamed is constituted by a pipe and which further includes an annular member surrounding said pipe, said annular member serving to support said contact bridge and cause the same to bear against the edge portions of the slit in the pipe, and a plurality of slidably adjustable pipe shaping members also supported by said annular member and which engage the pipe in spaced relation around the periphery thereof.

5. An inductive heating device as defined in claim 4 wherein said annular body is provided with a plurality of radial bores arranged in spaced relation, one of said bores serving to receive said contact bridge and the other bores serving to receive said pipe shaping members.

6. An inductive heating device as defined in claim 5 wherein said annular body is provided with four of said radial bores spaced 90° apart.

References Cited in the file of this patent

UNITED STATES PATENTS

| | | |
|---|---|---|
| 1,915,639 | Woofter | June 27, 1933 |
| 2,086,305 | Sessions | July 6, 1937 |
| 2,335,895 | Adams | Dec. 7, 1943 |
| 2,402,381 | Diller | June 18, 1946 |
| 2,763,756 | Rudd et al. | Sept. 18, 1956 |
| 2,774,857 | Rudd et al. | Dec. 18, 1956 |
| 2,846,554 | Baffrey et al. | Aug. 5, 1958 |
| 2,931,885 | Underwood et al. | Apr. 5, 1960 |